(12) United States Patent
Wang et al.

(10) Patent No.: US 12,725,784 B2
(45) Date of Patent: Sep. 1, 2026

(54) METHOD OF MANUFACTURING COMPOSITE ELECTRODES

(71) Applicant: GM GLOBAL TECHNOLOGY OPERATIONS LLC, Detroit, MI (US)

(72) Inventors: Chuanlong Wang, Troy, MI (US); Xiaosong Huang, Novi, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 870 days.

(21) Appl. No.: 18/099,568

(22) Filed: Jan. 20, 2023

(65) Prior Publication Data

US 2024/0250238 A1 Jul. 25, 2024

(51) Int. Cl.
*H01M 4/139* (2010.01)
*H01M 4/62* (2006.01)
*H01M 4/86* (2006.01)

(52) U.S. Cl.
CPC ........... *H01M 4/139* (2013.01); *H01M 4/623* (2013.01); *H01M 4/8652* (2013.01)

(58) Field of Classification Search
CPC ........ H01M 4/139; H01M 4/62; H01M 4/623; H01M 4/86; H01M 4/8652
USPC ........................................................... 429/209
See application file for complete search history.

(56) References Cited

U.S. PATENT DOCUMENTS 5,106,709 A * 4/1992 Tekkanat et al. ....... H01M 4/68 429/235
2012/0202114 A1 8/2012 Madray et al.
2015/0116905 A1* 4/2015 Gadkaree et al. ..... H01G 11/60 29/25.03
2023/0268478 A1* 8/2023 Rodgers et al. ........ H01M 4/04 264/104

FOREIGN PATENT DOCUMENTS

DE 102020129153 A1 10/2021
WO WO-2022270604 A1 12/2022

OTHER PUBLICATIONS

U.S. Appl. No. 17/675,884, filed Feb. 18, 2022, Rodgers et al.
(Continued)

*Primary Examiner* — Kevin P Kerns

(57) ABSTRACT

A composite electrode for an electrochemical cell that cycles lithium ions is manufactured by introducing a solvent, a binder, electroactive material particles, and an electrically conductive agent into a screw extruder to form an electrode precursor mixture. The electrode precursor mixture is discharged from the screw extruder and deposited on a metal substrate to form an electrode precursor layer. The electrode precursor layer is calendared by passing the electrode precursor layer between rollers to adhere the electrode precursor layer to and uniformly distribute the electrode precursor layer over the metal substrate. Then, the electrode precursor layer is dried to remove the solvent therefrom and form a solid electrode layer including the electroactive material particles, the electrically conductive agent, and the binder on the surface of the metal substrate.

20 Claims, 2 Drawing Sheets

(56) References Cited

OTHER PUBLICATIONS

Ravikumar, Vikram R. "y-Valerolactone: An Alternative Solvent for Manufacturing of Lithium-Ion Battery Electrodes". www.acsaem.org; ACS Appl. Energy Mater. 2021, 4, 696-703; 8 pages.
Zhou, Hui et al. "Can Greener Cyrene Replace NMP for Electrode Preparation of NMC 811 Cathodes?" Journal of the Electrochemical Society; 168 040536; 7 pages.
Horváth, István et al. "y-Valerolactone—a sustainable liquid for energy and carbon-based chemicals" www.rsc.org/greenchem; Green Chemistry; Accepted Nov. 13, 2007; First published as an Advance Article on the web Dec. 4, 2007; DOI: 10.1039/b712863k; 5 pages.
Saillenfait, A.M. et al. "Developmental toxicity of N-methyl-2-pyrrolidone administered orally to rats" Food and Chemical Toxicoogy 40 (2002) 1705-1712; www.elsevier.com/locate/foodchemtox; Institut National de Recherche et de Sécurité, Avenue de Bourgogne, BP No. 27, 54501 Vandoeuvre, France; Accepted Mar. 4, 2002; 8 pages.
German Office Action from counterpart DE102023120979.5, dated Mar. 5, 2026.

* cited by examiner

METHOD OF MANUFACTURING COMPOSITE ELECTRODES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to methods of manufacturing composite electrodes and, more particularly, to methods of manufacturing composite electrodes in which innocuous polar aprotic solvent solvents are used to prepare electrode precursor mixtures of electroactive material particles, an electrically conductive agent, and a binder.

Electrochemical cells that cycle lithium ions generally include a negative electrode, a positive electrode, and an electrolyte that provides a medium for the conduction of lithium ions between the negative and positive electrodes during discharge and recharge of the electrochemical cell. The electrodes are oftentimes composite materials and, during manufacture thereof, are deposited in the form of thin layers on electrically conductive metal current collectors. The composite electrodes may comprise a mixture of electroactive material particles, electrically conductive additives, and a binder. The electrically conductive additives provide the composite electrodes with good electrical conductivity and ensure sufficient electrical contact between the electroactive material particles. The binder provides the composite electrodes with good mechanical stability, for example, by helping the composite electrodes adhere to the surface of the metal current collectors and providing sufficient cohesion between the components of the composite electrodes.

During manufacture of the composite electrodes, a slurry of electroactive material particles, electrically conductive additives, and a binder dissolved and/or suspended in a polar aprotic solvent is oftentimes prepared and cast or deposited on a metal current collector using a slot die or transfer-roll coating process. Polyvinylidene fluoride (PVDF) is oftentimes used as the binder in positive electrodes of lithium batteries due to its high thermal, chemical, and electrochemical stability, excellent cohesion and adhesion properties, and mechanical flexibility. N-methyl-2-pyrrolidone (NMP) is oftentimes used as the solvent due to its high chemical and thermal stability, as well as its ability to effectively dissolve PVDF. NMP, however, may be considered toxic and may invoke certain regulatory requirements and/or scrutiny.

SUMMARY

A method of manufacturing a composite electrode for an electrochemical cell that cycles lithium ions is disclosed. The method comprises multiple steps. In step (a), a solvent mixture comprising a polar aprotic solvent and a binder are introduced into a screw extruder. In step (b), electroactive material particles and an electrically conductive agent are introduced into the solvent mixture in the screw extruder to form an electrode precursor mixture. In step (c), the electrode precursor mixture is discharged from the screw extruder and deposited on a surface of a metal substrate to form an electrode precursor layer on the metal substrate. The electrode precursor layer has a facing surface that faces away from the metal substrate. In step (d), the electrode precursor layer is calendared by passing the electrode precursor layer between a first set of rollers to adhere the electrode precursor layer to and uniformly distribute the electrode precursor layer over the metal substrate. In step (e), the electrode precursor layer is dried to remove the solvent from the electrode precursor layer and form a solid electrode layer including the electroactive material particles, the electrically conductive agent, and the binder on the surface of the metal substrate.

The polar aprotic solvent may comprise γ-valerolactone, dihydrolevoglucosenone, or a combination thereof. The electrode precursor mixture may be substantially free of N-methylpyrrolidone. The binder may comprise polyvinylidene fluoride (PVDF) or a copolymer thereof.

The electrode precursor mixture may have a solids content of, by weight, greater than or equal to about 80%.

The electroactive material particles may constitute, by weight, greater than or equal to about 60% to less than or equal to about 85% of the electrode precursor mixture. The polar aprotic solvent may constitute, by weight, greater than or equal to about 10% to less than about 40% of the electrode precursor mixture. The binder may constitute, by weight, greater than or equal to about 0.1% to less than or equal to about 8% of the electrode precursor mixture. The electrically conductive agent may constitute, by weight, greater than or equal to about 0.4% to less than or equal to about 4% of the electrode precursor mixture.

The screw extruder may comprise a stationary barrel defining a cylindrical channel extending between a first end and an opposite second end thereof, and a rotatable screw disposed within the cylindrical channel. In such case, the rotatable screw may have an axis of rotation extending at angle of greater than or equal to about 0 degrees to less than or equal to about 180 degrees with respect to a plane defined by the surface of the metal substrate.

The stationary barrel may comprise a first inlet opening and at least one second inlet opening in fluid communication with the cylindrical channel and located between the first end and the second end thereof. In such case, the first inlet opening may be located upstream of the at least one second inlet opening relative to a flow direction of the electrode precursor mixture through the cylindrical channel, the solvent mixture may be introduced into the cylindrical channel via the first inlet opening, and the electroactive material particles and the electrically conductive agent may be introduced into the cylindrical channel via the at least one second inlet opening.

The electrode precursor mixture may be deposited on the metal substrate in step (c) at a temperature of greater than or equal to about 25 degrees Celsius to less than or equal to about 80 degrees Celsius.

The first set of rollers may be spaced-apart from one another by a gap of greater than or equal to about 200 micrometers to less than or equal to about 250 micrometers.

The electrode precursor layer may be dried in step (e) by heating the electrode precursor layer at a temperature of greater than or equal to about 50° C. to less than or equal to about 150° C. for a duration of greater than or equal to about 30 seconds to less than or equal to about 10 minutes to evaporate the solvent therefrom.

The method may further comprise, prior to step (d), applying a release film to the facing surface of the electrode precursor layer to form a laminate structure including the metal substrate, the electrode precursor layer, and the release film. In such case, the electrode precursor layer may be calendared in step (d) by passing the laminate structure between the first set of rollers.

The method may further comprise, after step (d) and prior to step (e), removing the release film from the facing surface of the electrode precursor layer.

The method may further comprise, after step (e), calendaring the solid electrode layer by passing the solid electrode layer and the metal substrate between a second set of rollers to consolidate the electroactive material particles, the electrically conductive agent, and the binder in the solid electrode layer and form the composite electrode.

The second set of rollers may be spaced-apart from on another by a gap of greater than or equal to about 100 micrometers to less than or equal to about 200 micrometers.

Prior to calendaring the solid electrode layer, the solid electrode layer may exhibit a porosity of greater than or equal to about 40%. After calendaring the solid electrode layer, the solid electrode layer may exhibit a porosity of greater than or equal to about 20% to less than or equal to about 35%.

The electroactive material particles may constitute, by weight, greater than or equal to about 90% to less than or equal to about 99% of the solid electrode layer. The binder may constitute, by weight, greater than or equal to about 0.1% to less than or equal to about 9% of the solid electrode layer. The electrically conductive agent may constitute, by weight, greater than or equal to about 0.5% to less than or equal to about 5% of the solid electrode layer.

A method of manufacturing a composite positive electrode for an electrochemical cell that cycles lithium ions is disclosed. The method comprises multiple steps. In step (a), a solvent mixture comprising a polar aprotic solvent and a binder is introduced into a screw extruder. The polar aprotic solvent comprises γ-valerolactone, dihydrolevoglucosenone, or a combination thereof. The binder comprises polyvinylidene fluoride or a copolymer thereof. In step (b), electroactive material particles and an electrically conductive agent are introduced into the solvent mixture in the screw extruder to form an electrode precursor mixture having a solids content of, by weight, greater than or equal to about 80%. The electroactive material particles comprise at least one transition metal oxide that can undergo the reversible intercalation of lithium ions. In step (c), the electrode precursor mixture is discharged from the screw extruder and deposited on a surface of a metal substrate to form an electrode precursor layer on the metal substrate. The electrode precursor layer has a facing surface that faces away from the metal substrate. In step (d), a release film is applied to the facing surface of the electrode precursor layer to form a laminate structure including the metal substrate, the electrode precursor layer, and the release film. In step (e), the electrode precursor layer is calendared by passing the laminate structure between a first set of rollers to adhere the electrode precursor layer to and uniformly distribute the electrode precursor layer over the metal substrate. In step (f), the release film is removed from the facing surface of the electrode precursor layer. In step (g), the electrode precursor layer is dried to remove the solvent from the electrode precursor layer and form a solid electrode layer including the electroactive material particles, the electrically conductive agent, and the binder on the surface of the metal substrate. In step (h), the solid electrode layer is calendared by passing the solid electrode layer and the metal substrate between a second set of rollers to consolidate the electroactive material particles, the electrically conductive agent, and the binder in the solid electrode layer and form the composite positive electrode.

The method may be performed on a continuous basis using a roll-to-roll technique. In such case, the metal substrate may be in the form of a continuous web extending between an inlet roll and an outlet roll, and wherein, after calendaring the solid electrode layer, the composite positive electrode may be wound around the outlet roll.

The screw extruder may comprise a stationary barrel defining a cylindrical channel extending between a first end and an opposite second end thereof, and a rotatable screw disposed within the cylindrical channel. In such case, the rotatable screw may have an axis of rotation extending at angle of greater than or equal to about 0 degrees to less than or equal to about 180 degrees with respect to a plane defined by the surface of the metal substrate.

The stationary barrel may comprise a first inlet opening and at least one second inlet opening in fluid communication with the cylindrical channel and located between the first end and the second end thereof. In such case, the first inlet opening may be located upstream of the at least one second inlet opening relative to a flow direction of the electrode precursor mixture through the cylindrical channel, the solvent mixture may be introduced into the cylindrical channel via the first inlet opening, and the electroactive material particles and the electrically conductive agent may be introduced into the cylindrical channel via the at least one second inlet opening.

The electrode precursor mixture may be deposited on the metal substrate at a temperature of greater than or equal to about 25 degrees Celsius to less than or equal to about 80 degrees Celsius.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In a method of manufacturing a composite electrode according to the present disclosure, an electrode precursor mixture is prepared by dissolving or dispersing electroactive material particles, an electrically conductive agent, and a binder in an innocuous solvent, e.g., γ-valerolactone and/or dihydrolevoglucosenone. The binder may comprise polyvinylidene fluoride (PVDF) and the innocuous solvent may have relatively low solubility for PVDF, as compared to the solubility of PVDF in n-methylpyrrolidone (NMP). To compensate for the low solubility of PVDF in the innocuous solvent, the components of the electrode precursor mixture are mixed together and deposited on a surface of a metal substrate using a screw extrusion process. Using a screw extrusion process to deposit the electrode precursor mixture on the metal substrate, instead of a slot die coating process, allows the electrode precursor mixture to exhibit a high solids content and a relatively high viscosity, as compared to the maximum viscosity that could practically be used in a slot die coating process. For example, the electrode precursor mixture may exhibit a high solids content of greater than or equal to about 60%, or optionally greater than or equal to about 80% by weight of the electrode precursor mixture during the screw extrusion process.

Figure 1:
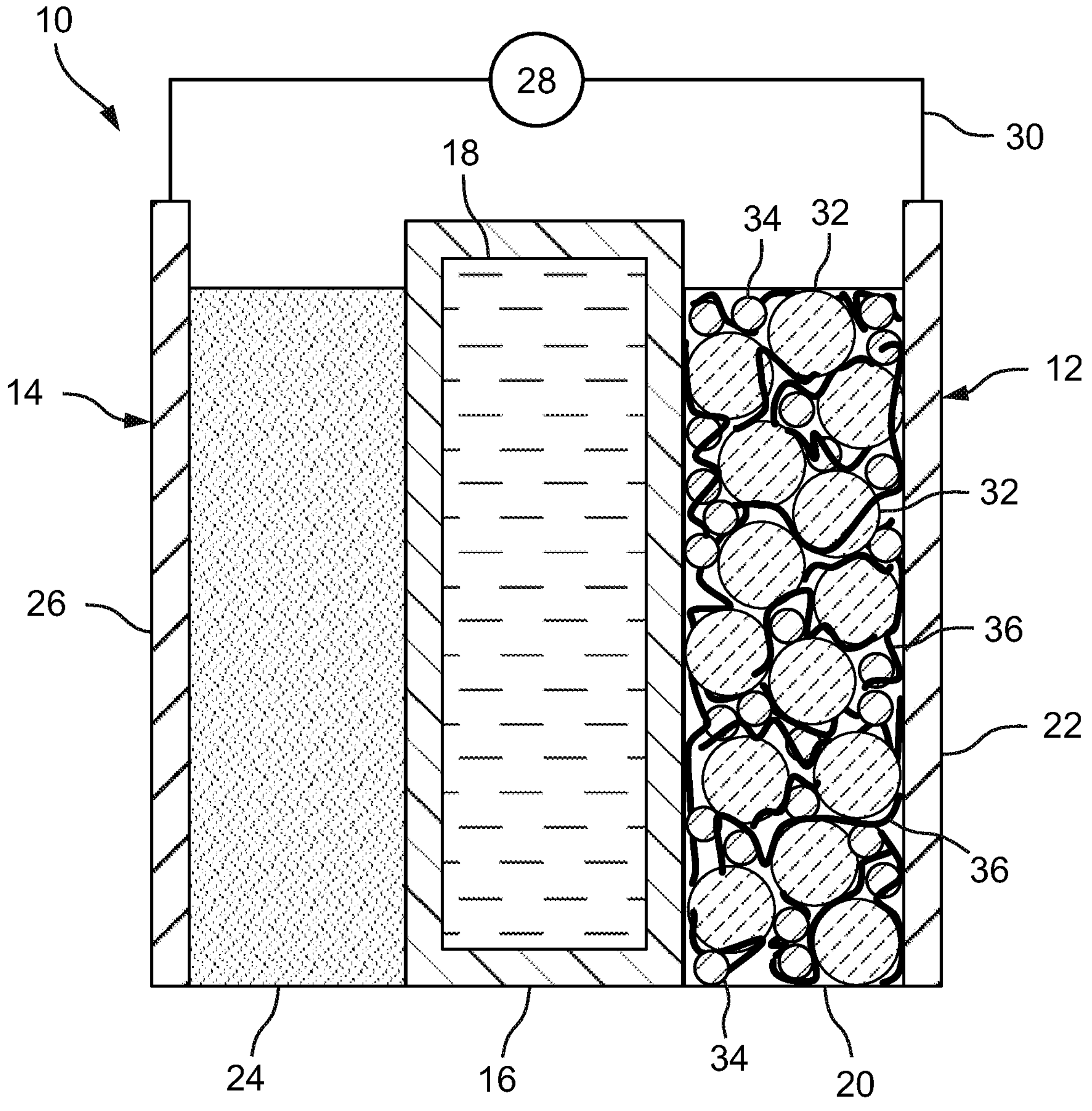
FIG. 1 is a schematic cross-sectional view of an electrochemical cell that cycles lithium ions, the electrochemical cell comprising a positive electrode layer disposed on a positive electrode current collector, a negative electrode layer disposed on a negative electrode current collector, and a porous separator sandwiched between the positive and negative electrode layers.

FIG. 1 depicts a schematic side cross-sectional view of an electrochemical cell 10 that cycles lithium ions. The electrochemical cell 10 comprises a positive electrode 12, a negative electrode 14, a porous separator 16, and an electrolyte 18. The positive electrode 12 comprises a positive electrode layer 20 disposed on a major surface of a positive electrode current collector 22. The negative electrode 14 comprises a negative electrode layer 24 disposed on a major surface of a negative electrode current collector 26. In practice, the positive and negative electrode current collectors 22, 26 may be electrically coupled to a power source or load 28 via an external circuit 30.

The positive electrode layer 20 is configured to store and release lithium ions during discharge and charge of the electrochemical cell 10. The positive electrode layer 20 may be in the form of a porous composite material and may be deposited directly or indirectly on the major surface of the positive electrode current collector 22. For example, the positive electrode layer 20 may comprise a substantially homogenous mixture of one or more electrochemically active (electroactive) material particles 32, an electrically conductive agent 34, and a binder 36.

The electroactive material particles 32 comprise a material that can undergo a reversible redox reaction with lithium, e.g., a material that can sufficiently undergo lithium intercalation and deintercalation, alloying and dealloying, or plating and stripping. In one form, the electroactive material particles 32 may comprise an intercalation host material that can undergo the reversible insertion or intercalation of lithium ions. In such case, the electroactive material particles 32 may comprise a lithium transition metal oxide. For example, the electroactive material particles 32 may comprise a layered oxide represented by the formula $LiMeO_2$, an olivine-type oxide represented by the formula $LiMePO_4$, a spinel-type oxide represented by the formula $LiMe_2O_4$, a tavorite represented by one or both of the following formulas $LiMeSO_4F$ or $LiMePO_4F$, or a combination thereof, where Me is a transition metal (e.g., Co, Ni, Mn, Fe, Al, V, or a combination thereof). In some embodiments, the electroactive material particles 32 may comprise a lithium transition metal oxide selected from the group consisting of lithium cobalt oxide (LCO), lithium manganese oxide (LMO), lithium nickel manganese cobalt oxide (NMC), lithium nickel cobalt aluminum oxide (NCA), lithium nickel cobalt manganese aluminum oxide (NCMA), and lithium manganese iron phosphate (LMFP). In another form, the electroactive material particles 32 may comprise a conversion material including a component that can undergo a reversible electrochemical reaction with lithium, in which the component undergoes a phase change or a change in crystalline structure accompanied by a change in oxidation state. In such case, the electroactive material particles 32 may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of suitable metals for inclusion in the conversion material of the electroactive material particles 32 include iron, manganese, nickel, copper, and cobalt. The electroactive material particles 32 may constitute, by weight, greater than or equal to about 90% or optionally about 95% to less than or equal to about 99% or optionally about 98% of the positive electrode layer 20. For example, in some embodiments, the electroactive material particles 32 may constitute, by weight, about 97% of the positive electrode layer 20.

The electrically conductive agent 34 is formulated to provide the positive electrode layer 20 with good electrical conductivity and to help establish sufficient electrical contact between the electroactive material particles 32 within the positive electrode layer 20. The electrically conductive agent 34 may comprise a carbon-based material. For example, the electrically conductive agent 34 may comprise particles of high surface area carbon black, acetylene black, or graphite, carbon fibers, carbon nanohorns, carbon nanotubes (e.g., single-wall or multiwall carbon nanotubes), onion-like carbon, graphene (e.g., graphene nanoplatelets), or a combination thereof. The electrically conductive agent 34 may constitute, by weight, greater than or equal to about 0.5% or optionally about 1% to less than or equal to about 5% or optionally about 3% of the positive electrode layer 20. For example, in some embodiments, the electrically conductive agent 34 may constitute, by weight, about 1.5% of the positive electrode layer 20. In some embodiments, the electrically conductive agent 34 may comprise a mixture of carbon black, carbon nanotubes, and graphene nanoplatelets. In such case, the carbon black may constitute, by weight, greater than or equal to about 0.1% or optionally about 0.4% to less than or equal to about 2% or optionally about 1.5% of the electrically conductive agent 34, the carbon nanotubes may constitute, by weight, greater than or equal to about 0.05% to less than or equal to about 0.3% of the electrically conductive agent 34, and the graphene nanoplatelets may constitute, by weight, greater than or equal to about 0.2% to less than or equal to about 1.5% of the electrically conductive agent 34. In some embodiments, the carbon black may constitute, by weight, about 0.8% of the electrically conductive agent 34, the carbon nanotubes may constitute, by weight, about 0.1% of the electrically conductive agent 34, and the graphene nanoplatelets may constitute, by weight, about 0.6% of the electrically conductive agent 34.

The binder 36 is formulated to provide the positive electrode layer 20 with structural integrity, for example, by adhering the positive electrode layer 20 to the major surface of the positive electrode current collector 22 and by promoting cohesion between the components of the positive electrode layer 20 (e.g., the electroactive material particles 32 and the electrically conductive agent 34). The binder 36 may comprise a polymer. For example, the binder 36 may comprise polyvinylidene fluoride (PVDF), ethylene propylene diene monomer (EPDM) rubber, styrene butadiene rubber (SBR), carboxymethyl cellulose (CMC), polyacrylic acid (PAA), copolymers of PVDF, EPDM rubber, SBR, CMC, and/or PAA, or a combination thereof. In some embodiments, the binder 36 may comprise or consist of polyvinylidene fluoride or a copolymer thereof. In embodiments where the binder 36 comprises polyvinylidene fluoride, the polyvinylidene fluoride may have a molecular weight of greater than or equal to about 700 kilodaltons (kDa), optionally about 800 kilodaltons, or optionally about 830 kilodaltons. The binder 36 may constitute, by weight, greater than or equal to about 0.1%, optionally about 0.5%, or optionally about 1% to less than or equal to about 9%, optionally about 5%, or optionally about 3% of the positive electrode layer 20. For example, in some embodiments, the binder 36 may constitute, by weight, about 1.5% of the positive electrode layer 20.

The negative electrode layer 24 is configured to store and release lithium ions during charge and discharge of the electrochemical cell 10. In some embodiments, the negative electrode layer 24 may be in the form of a porous composite material. Although not depicted in FIG. 1, the negative electrode layer 24 may comprise a substantially homogenous mixture of one or more electroactive material particles, an electrically conductive agent, and a binder (not shown). In such case, the electroactive material particles of the negative electrode layer 24 may comprise a material that can undergo the reversible insertion or intercalation of lithium ions at a lower electrochemical potential than the electrochemically active material of the positive electrode layer 20 such that an electrochemical potential difference exists between the positive and negative electrode layers 20, 24. In embodiments, the electroactive material particles of the negative electrode layer 24 may comprise particles of a graphite-based material. Additionally or alternatively, the electroactive material particles of the negative electrode layer 24 may comprise lithium, silicon, tin oxide, aluminum, indium, zinc, germanium, silicon oxide (silica), titanium oxide, and/or lithium titanate. The same materials used as the binder 36 and the electrically conductive agent 34 in the positive electrode layer 20 may be used as the binder and the electrically conductive agent in the negative electrode layer 24.

The porous separator 16 physically and electrically isolates the positive electrode layer 20 and the negative electrode layer 24 from each other while permitting lithium ions to pass therethrough. The porous separator 16 exhibits an open microporous structure and may comprise an organic and/or inorganic material. For example, the porous separator 16 may comprise a polymer or a combination of polymers. For example, the porous separator 16 may comprise one or more polyolefins, e.g., polyethylene (PE), polypropylene (PP), polyamide (PA), poly(tetrafluoroethylene) (PTFE), polyvinylidene fluoride (PVdF), and/or poly(vinyl chloride) (PVC). In one form, the porous separator 16 may comprise a laminate of polymers, e.g., a laminate of PE and PP. In some aspects, the porous separator 16 may comprise a ceramic coating (not shown) disposed on one or both sides thereof. In such case, the ceramic coating may comprise particles of alumina ($Al_2O_3$) and/or silica ($SiO_2$).

The electrolyte 18 is ionically conductive and provides a medium for the conduction of lithium ions between the positive electrode layer 20 and the negative electrode layer 24. In assembly, the electrochemical cell 10 may be infiltrated with the electrolyte 18 and the positive electrode layer 20, the porous separator 16, and the negative electrode layer 24 may be in direct physical contact with the electrolyte 18. The electrolyte 18 may be in the form of a nonaqueous liquid electrolyte, a gel electrolyte, or a solid electrolyte. When the electrolyte 18 is in the form of a liquid, the electrolyte 18 may comprise a nonaqueous liquid electrolyte solution comprising a lithium salt dissolved or ionized in a nonaqueous, aprotic organic solvent or a mixture of nonaqueous, aprotic organic solvents. Examples of lithium salts include $LiClO_4$, $LiAlCl_4$, LiI, LiBr, LiSCN, $LiBF_4$, $LIB(C_6H_5)_4$, $LiAsF_6$, $LiCF_3SO_3$, $LiN(CF_3SO_2)_2$, $Li_2CO_3$, $LiPF_6$, and combinations thereof. Examples of nonaqueous, aprotic organic solvents include cyclic carbonates (i.e., ethylene carbonate, propylene carbonate), acyclic carbonates (i.e., dimethyl carbonate, diethyl carbonate, ethyl methyl carbonate), aliphatic carboxylic esters (i.e., methyl formate, methyl acetate, methyl propionate), γ-lactones (i.e., γ-butyrolactone, γ-valerolactone), acyclic ethers (i.e., 1,2-dimethoxyethane, 1,2-diethoxyethane, ethoxymethoxyethane), and/or cyclic ethers (i.e., tetrahydrofuran, 2-methyltetrahydrofuran). The electrolyte 18 optionally may comprise one or more additives, for example, one or more of lithium difluoro(oxalato)borate (LiDFOB), lithium bis(oxalato)borate (LiBOB), fluoroethylene carbonate (FEC), and vinylene carbonate (VC).

The positive and negative electrode current collectors 22, 26 may be in the form of thin and flexible porous or non-porous electrically conductive metal substrates. In aspects, the negative electrode current collector 26 may comprise copper (Cu), nickel (Ni), an iron (Fe) alloy (e.g., stainless steel), or titanium (Ti) and the positive electrode current collector 22 may comprise aluminum, nickel, or an iron alloy (e.g., stainless steel). Other electrically conductive metals may of course be used, if desired.

Methods

Figure 2:
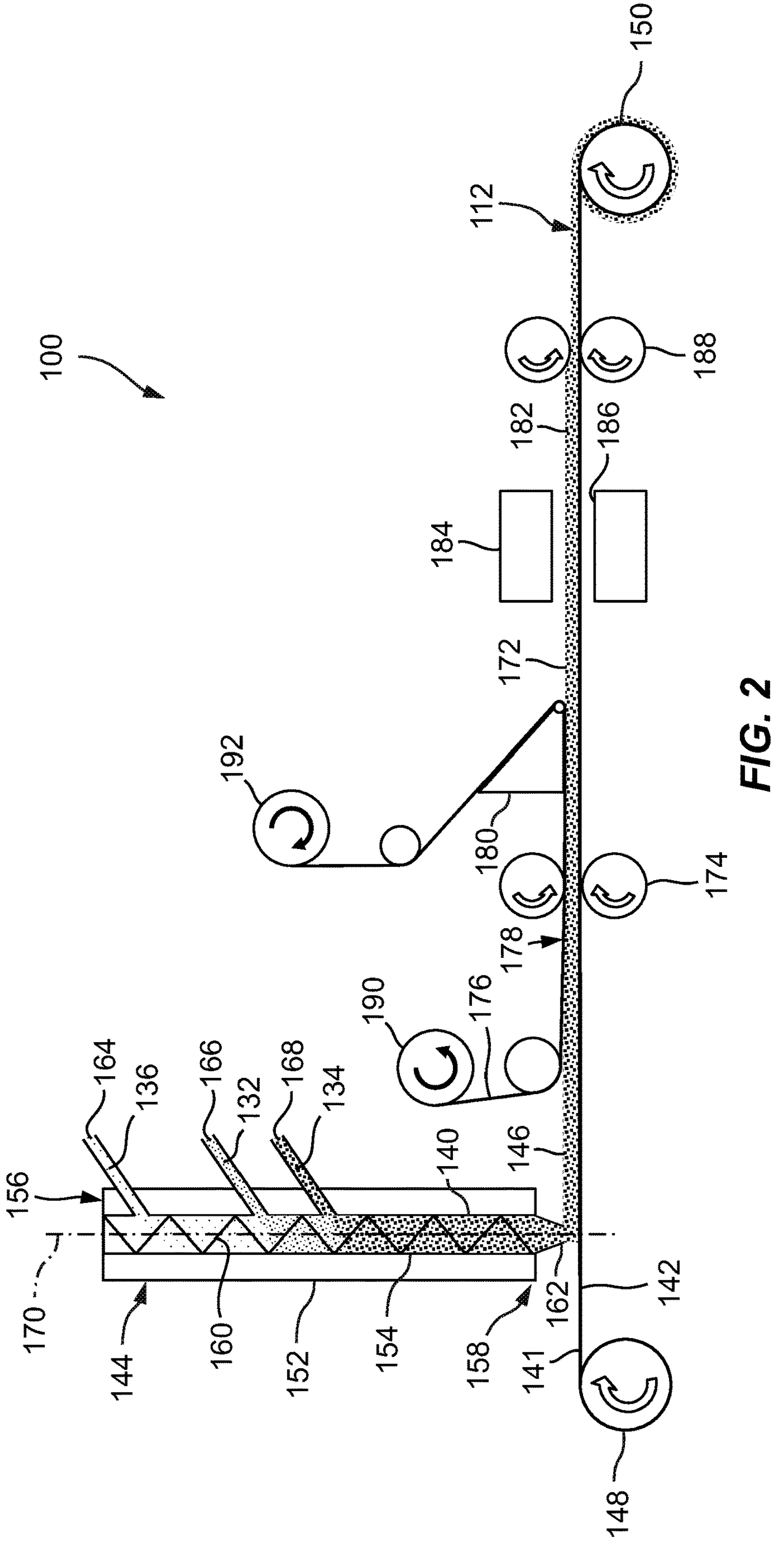
FIG. 2 is a schematic diagram of a method for manufacturing a composite electrode for an electrochemical cell that cycles lithium ions.

FIG. 2 is a schematic diagram of a method 100 of manufacturing a composite electrode 112 for an electrochemical cell that cycles lithium ions, such as the electrochemical cell 10 depicted in FIG. 1. For example, the method 100 may be used to manufacture the positive electrode 12 and/or the negative electrode 14. The method 100 may include one or more of the following steps. In a first step, an electrode precursor mixture 140 may be prepared and deposited on an upper surface 141 of a metal substrate 142 using a screw extrusion process (i.e., using a screw extruder 144) to form an electrode precursor layer 146 on the surface of the metal substrate 142. The method 100 may be performed on a continuous basis using a roll-to-roll technique. In such case, as shown in FIG. 2, the metal substrate 142 may be in the form of a continuous sheet or web extending in a substantially horizontal direction between an inlet roll 148 and an outlet roll 150 and the metal substrate 142 may be continually advanced through the various steps of the composite electrode 112 manufacturing process by being unwound from the inlet roll 148 and rewound around the outlet roll 150 at the end of the manufacturing process. The metal substrate 142 may be made of the same materials as that of the positive electrode current collector 22 or the negative electrode current collector 26.

The screw extruder 144 may include a stationary barrel 152 defining a cylindrical channel 154 extending between a first end 156 and an opposite second end 158 thereof, and a rotatable screw 160 disposed within the cylindrical channel 154. The stationary barrel 152 may have an internal width or an internal diameter and a length defined between the first end 156 and the second end 158 thereof. The stationary barrel 152 may include one or more inlet openings positioned between the first end 156 and the second end 158 thereof and an outlet opening 162 from which the electrode precursor mixture 140 is discharged. The one or more inlet openings in the stationary barrel 152 may be configured to receive one or more components of the electrode precursor mixture 140 and to introduce such components into the cylindrical channel 154. In FIG. 2, the stationary barrel 152 includes first, second, and third inlet openings 164, 166, 168 spaced apart from one another along the length of the stationary barrel 152, with the first inlet opening 164 being located upstream of the second and third inlet openings 166, 168, with respect to a flow direction of the components of the electrode precursor mixture 140 through the cylindrical channel 154.

The rotatable screw 160 is configured to advance the components of the electrode precursor mixture 140 through the cylindrical channel 154, from the first end 156 to the second end 158 of the stationary barrel 152 and to force the electrode precursor mixture 140 through the outlet opening 162 in the second end 158 of the stationary barrel 152. As shown in FIG. 2, the rotatable screw 160 may have an axis of rotation 170 extending in a vertical direction substantially perpendicular to the upper surface 141 of the metal substrate 142, i.e., at an angle of about 90 degrees from the upper surface 141 of the metal substrate 142. In other embodiments, the axis of rotation 162 of the rotatable screw 160 may extend substantially parallel to a plane defined by the upper surface 141 of the metal substrate 142. In some embodiments, the axis of rotation 162 of the rotatable screw 160 may extend at angle of greater than or equal to about 0 degrees to less than or equal to about 180 degrees with respect to a plane defined by the upper surface 141 of the metal substrate 142. In some embodiments, the axis of rotation 162 of the rotatable screw 160 may extend at angle of greater than or equal to about 45 degrees to less than or equal to about 135 degrees with respect to a plane defined by the upper surface 141 of the metal substrate 142.

The electrode precursor mixture 140 may comprise a mixture of electroactive material particles 132, an electrically conductive agent 134, a binder, and a solvent. The electroactive material particles 132 may comprise the same material as the electroactive material particles 32 of the positive electrode layer 20 or the same material as that of the electroactive material particles of the negative electrode layer 24. The electroactive material particles 132 may constitute, by weight, greater than or equal to about 60% to less than or equal to about 85% of the electrode precursor mixture 140. The electrically conductive agent 134 may comprise the same material as the electrically conductive agent 34 of the positive electrode layer 20. The electrically conductive agent 134 may constitute, by weight, greater than or equal to about 0.4% to less than or equal to about 4% of the electrode precursor mixture 140. The binder may comprise the same material as the binder 36 of the positive electrode layer 20. The binder may constitute, by weight, greater than or equal to about 0.1% to less than or equal to about 8% of the electrode precursor mixture 140. The solvent may comprise a polar aprotic solvent that is substantially nontoxic or innocuous. For example, the solvent may comprise γ-valerolactone (GVL), dihydrolevoglucosenone (commercially known as Cyrene), or a combination thereof. In some embodiments, the electrode precursor mixture 140 may be substantially free of other polar aprotic solvents. For example, in some embodiments, the electrode precursor mixture 140 may be substantially free of N-methylpyrrolidone (also known as NMP or 1-methyl-2-pyrrolidone). The solvent may constitute, by weight, greater than or equal to about 10% to less than about 40% of the electrode precursor mixture 140. The electrode precursor mixture 140 may have a solids content of, by weight, greater than or equal to about 60%, optionally about 70%, optionally about 80%, or optionally about 85%.

The electroactive material particles 132, the electrically conductive agent 134, the binder, and the solvent may be introduced into the cylindrical channel 154 together via one of the inlet openings in the stationary barrel 152, separately via different inlet openings, or in various combinations via two or more inlet openings in the stationary barrel 152. In FIG. 2, a solvent mixture 136 including a substantially homogenous mixture of the binder and the solvent is introduced into the cylindrical channel 154 via the first inlet opening 164 in the stationary barrel 152, and the electroactive material particles 132 and the electrically conductive agent 134 are introduced into the cylindrical channel 154 downstream of the first inlet opening 164 respectively via the second inlet opening 166 and the third inlet opening 168 in the stationary barrel 152. However, other arrangements are possible. For example, in other embodiments, the electrically conductive agent 134 may be introduced into the cylindrical channel 154 via the second inlet opening 166 and the electroactive material particles 132 may be introduced into the cylindrical channel 154 via the third inlet opening 168 in the stationary barrel 152. As another example, in some embodiments, both the electroactive material particles 132 and the electrically conductive agent 134 may be introduced into the cylindrical channel 154 as a substantially homogenous mixture thereof via the second inlet opening 166 or the third inlet opening 168 in the stationary barrel 152.

The electrode precursor layer 146 may be deposited directly or indirectly on the surface 141 of the metal substrate 142 at a temperature of greater than or equal to about 25 degrees Celsius to less than or equal to about 80 degrees Celsius, or optionally less than or equal to about 60 degrees Celsius. The electrode precursor layer 146 may be deposited directly or indirectly on the surface 141 of the metal substrate 142 and may have a facing surface 172 that faces away from the metal substrate 142.

Slurry compositions used in slot die coating processes must necessarily exhibit a relatively low viscosity, as compared to the viscosity of the electrode precursor mixture 140. This is because slurries with high viscosities may cause problems for slot die coaters and may limit coating speed. However, it may be desirable for electrode precursor compositions (e.g., slurry compositions used in slot die coating processes) to exhibit high solids contents (e.g., greater than or equal to about 80% solids) so that the resulting electrode layers will exhibit a high loading of electroactive material particles, as compared to the loading or amount of inert materials (e.g., conductive agents and binder) in the electrode layers, thereby improving the volumetric energy density thereof. But, in general, increasing the solids content of the electrode precursor mixture 140 (or of the slurry composition used in a slot die coating process) will result in a corresponding increase in viscosity.

Without intending to be bound by theory, it is believed that, when a screw extrusion process is used to uniformly mix or blend the components of the electrode precursor mixture 140 together and to deposit the electrode precursor layer 146 on the metal substrate 142, the electrode precursor mixture 140 experiences a relatively high shear force. And the relatively high shear force experienced by the electrode precursor mixture 140 during the screw extrusion process is believed to effectively and efficiently blend the components of the electrode precursor mixture 140 together prior to depositing the electrode precursor layer 146 on the metal substrate 142. In addition, using a screw extrusion process to deposit the electrode precursor layer 146 on the metal substrate 142, instead of a slot die coating process, allows for the generation of a sufficiently high force and/or pressure on the electrode precursor mixture 140 to push the electrode precursor mixture 140 out of the outlet opening 162 of the stationary barrel 152. Due to the relatively high solids content and relatively high viscosity of the electrode precursor mixture 140, the force and/or pressure required to push the electrode precursor mixture 140 out of the outlet opening 162 of the stationary barrel 152 may be relatively high and may be substantially higher than the force and/or pressure that could practically be generated using a slot die coating process.

The efficient and effective mixing capabilities of the screw extrusion process, as well as the relatively high forces and/or pressures generated during extrusion of the electrode precursor mixture 140, make it practical to deposit the electrode precursor mixture 140 on the surface 141 of the metal substrate 142 at temperatures less than or equal to about 80 degrees Celsius, or optionally less than or equal to about 60 degrees Celsius. By contrast, the inventors of the present disclosure have discovered that, if a slot die process was used to deposit an electrode precursor mixture having a solids content of less than or equal to about 60% and including, by weight, greater than or equal to about 40% γ-valerolactone and about 3-5% PVDF, the electrode precursor mixture would need to be heated to a temperature of greater than or equal to about 60° C. to ensure adequate mixing of the components of the electrode precursor mixture and successful deposition of a uniform layer of the electrode precursor mixture on a substrate. As another example, the inventors of the present disclosure have discovered that, if a slot die process was used to deposit an electrode precursor mixture having a solids content of less than or equal to about 60% and including, by weight, greater than or equal to about 40% dihydrolevoglucosenone and about 3-5% PVDF, the electrode precursor mixture would need to be heated to a temperature of greater than or equal to about 80° C. to ensure adequate mixing of the components of the electrode precursor mixture and successful deposition of a uniform layer of the electrode precursor mixture on a substrate.

Due to the relatively low viscosity of slurry compositions used in slot die coating processes, after being deposited on a substrate, the slurry compositions tend to exhibit self-leveling properties, allowing for the formation of uniform coating layers after deposition. However, as discussed above, unlike slurry compositions used in slot die coating processes, the electrode precursor mixture 140 exhibits a relatively high viscosity when not being subjected to a shear force and does not exhibit self-leveling properties when deposited on the surface 141 of the metal substrate 142. As such, the facing surface 172 of the electrode precursor layer 146 may initially exhibit an uneven surface profile.

In a second step, the electrode precursor layer 146 may be calendered to help adhere the electrode precursor layer 146 to the surface 141 of the metal substrate 142 and to uniformly distribute the electrode precursor layer 146 over the surface 141 of the metal substrate 142. During the calendaring process, the electrode precursor layer 146 and the metal substrate 142 may be passed between a first set of rollers 174 and the electrode precursor layer 146 may be sandwiched between the first set of rollers 174 and the surface 141 of the metal substrate 142. The first set of rollers 174 may be spaced-apart from one another by a gap of greater than or equal to about 200 micrometers to less than or equal to about 250 micrometers. The electrode precursor layer 146 may be calendered at a temperature of greater than or equal to about 25° C. to less than or equal to about 100° C. In some aspects, the electrode precursor layer 146 may be calendered at about ambient temperature, e.g., about 25° C. The electrode precursor layer 146 may be advanced through the calendaring process by movement of the metal substrate 142 between the inlet roll 148 and the outlet roll 150.

In some embodiments, as shown in FIG. 2, prior to calendaring the electrode precursor layer 146, a release film 176 may be applied to the facing surface 172 of the electrode precursor layer 146 to form a laminate structure 178 including the metal substrate 142, the electrode precursor layer 146, and the release film 176. In such case, the electrode precursor layer 146 may be calendered by passing the laminate structure 178 between the first set of rollers 174. As such, during the calendaring process, the electrode precursor layer 146 may be sandwiched between the release film 176 and the surface 141 of the metal substrate 142. The release film 176 may comprise a non-stick material and may be constructed and arranged so as to prevent the electrode precursor layer 146 from sticking to the first set of rollers 174 during the calendaring process. After the laminate structure 178 has been passed through the first set of rollers 174, the release film 176 may be removed from the facing surface 172 of the electrode precursor layer 146. For example, as shown in FIG. 2, the release film 176 may be removed from the facing surface 172 of the electrode precursor layer 146 by using a block 180 to hold the electrode precursor layer 146 against the surface 141 of the metal substrate 142 as the release film 176 is pulled back from the facing surface 172 of the electrode precursor layer 146. Removing the release film 176 in this way may help prevent the electrode precursor layer 146 from sticking to the release film 176 during the removal process. In some embodiments, as shown in FIG. 2, the release film 176 may be unwound and supplied from a supply roll 190. And, after the release film 176 is removed from the electrode precursor layer 146, the release film 176 may be rewound around an up-take roll 192.

In a third step, the electrode precursor layer 146 may be dried to remove the solvent therefrom and form a solid electrode layer 182 including the electroactive material particles 132, the electrically conductive agent 134, and the binder on the surface 141 of the metal substrate 142. The electrode precursor layer 146 may be dried by passing the electrode precursor layer 146 and the metal substrate 142 through an oven 184 or other heating device defining a heated chamber or passageway 186. During the drying process, the electrode precursor layer 146 may be heated in the passageway 186 at a temperature of greater than or equal to about 50° C. to less than or equal to about 150° C. for a duration of greater than or equal to about 30 seconds to less than or equal to about 10 minutes to evaporate the solvent therefrom. The electrode precursor layer 146 may be advanced through the drying process by movement of the metal substrate 142 between the inlet roll 148 and the outlet roll 150. The solid electrode layer 182 may have substantially the same composition as that of the positive electrode layer 20 or the negative electrode layer 24.

In a fourth step, the solid electrode layer 182 may be calendered by passing the solid electrode layer 182 and the metal substrate 142 between a second set of rollers 188 to consolidate the electroactive material particles 132, the electrically conductive agent 134, and the binder in the solid electrode layer 182 and form the composite electrode 112 including the consolidated solid electrode layer 182 and the metal substrate 142. The second set of rollers 188 may be spaced-apart from one another by a gap of greater than or equal to about 100 micrometers to less than or equal to about 200 micrometers. The solid electrode layer 182 may be calendered at a temperature of greater than or equal to about 25° C. to less than or equal to about 100° C. In some aspects, the solid electrode layer 182 may be calendered at about ambient temperature, e.g., about 25° C. The solid electrode layer 182 may be advanced through the calendaring process by movement of the metal substrate 142 between the inlet roll 148 and the outlet roll 150.

Prior to calendaring, the solid electrode layer 182 may exhibit a thickness of greater than or equal to about 200 micrometers to less than or equal to about 250 micrometers and a porosity of greater than or equal to about 40%. After the solid electrode layer 182 is calendered, the solid electrode layer 182 may exhibit a thickness of greater than or equal to about 100 micrometers to less than or equal to about 200 micrometers and a porosity of greater than or equal to about 20% to less than or equal to about 35%. In some embodiments, after the solid electrode layer 182 is calendered, the solid electrode layer 182 may exhibit a porosity of about 30%.

After formation of the composite electrode 112, the composite electrode 112 including the consolidated solid electrode layer 182 and the metal substrate 142 may be wound around the outlet roll 150.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended terms "comprises," "comprising," "including," and "having," are to be understood as non-restrictive terms used to describe and claim various embodiments set forth herein, in certain aspects, the terms may alternatively be understood to instead be a more limiting and restrictive term, such as "consisting of" or "consisting essentially of." Thus, for any given embodiment reciting compositions, materials, components, elements, ingredients, features, integers, operations, and/or process steps, the present disclosure also specifically includes embodiments consisting of, or consisting essentially of, such recited compositions, materials, components, elements, ingredients, features, integers, operations, and/or process steps. In the case of "consisting of," the alternative embodiment excludes any additional compositions, materials, components, elements, ingredients, features, integers, operations, and/or process steps, while in the case of "consisting essentially of," any additional compositions, materials, components, elements, ingredients, features, integers, operations, and/or process steps that materially affect the basic and novel characteristics are excluded from such an embodiment, but any compositions, materials, components, elements, ingredients, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%. In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent of the composition or material on a weight percentage (%) basis. This may include compositions or materials having, by weight, greater than 50% X, as well as those having, by weight, less than 50% X, so long as X is the single largest constituent of the composition or material based upon its overall weight. When a composition or material is referred to as being "substantially free" of a substance, the composition or material may comprise, by weight, less than 5%, optionally less than 3%, optionally less than 1%, or optionally less than 0.1% of the substance.

As used herein, the term "metal" may refer to a pure elemental metal or to an alloy of an elemental metal and one or more other metal or nonmetal elements (referred to as "alloying" elements). The alloying elements may be selected to impart certain desirable properties to the alloy that are not exhibited by the base metal element.

What is claimed is:

1. A method of manufacturing a composite electrode for an electrochemical cell that cycles lithium ions, the method comprising the following steps:
- (a) introducing a solvent mixture comprising a polar aprotic solvent and a binder into a screw extruder;
- (b) introducing electroactive material particles and an electrically conductive agent into the solvent mixture in the screw extruder to form an electrode precursor mixture;
- (c) discharging the electrode precursor mixture from the screw extruder and depositing the electrode precursor mixture on a surface of a metal substrate to form an electrode precursor layer on the metal substrate, the electrode precursor layer having a facing surface that faces away from the metal substrate;
- (d) calendaring the electrode precursor layer by passing the electrode precursor layer between a first set of rollers to adhere the electrode precursor layer to and uniformly distribute the electrode precursor layer over the metal substrate; and
- (e) drying the electrode precursor layer to remove the solvent from the electrode precursor layer and form a solid electrode layer including the electroactive material particles, the electrically conductive agent, and the binder on the surface of the metal substrate.

2. The method of claim 1, wherein the polar aprotic solvent comprises γ-valerolactone, dihydrolevoglucosenone, or a combination thereof, the electrode precursor mixture is substantially free of N-methylpyrrolidone, and the binder comprises polyvinylidene fluoride (PVDF) or a copolymer thereof.

3. The method of claim 1, wherein the electrode precursor mixture has a solids content of, by weight, greater than or equal to about 80%.

4. The method of claim 1, wherein, by weight, the electroactive material particles constitute greater than or equal to about 60% to less than or equal to about 85% of the electrode precursor mixture, the polar aprotic solvent constitutes greater than or equal to about 10% to less than about 40% of the electrode precursor mixture, the binder constitutes greater than or equal to about 0.1% to less than or equal to about 8% of the electrode precursor mixture, and the electrically conductive agent constitutes greater than or equal to about 0.4% to less than or equal to about 4% of the electrode precursor mixture.

5. The method of claim 1, wherein the screw extruder comprises a stationary barrel defining a cylindrical channel extending between a first end and an opposite second end thereof, and a rotatable screw disposed within the cylindrical channel, and wherein the rotatable screw has an axis of rotation extending at an angle of greater than or equal to about 0 degrees to less than or equal to about 180 degrees with respect to a plane defined by the surface of the metal substrate.

6. The method of claim 5, wherein the stationary barrel comprises a first inlet opening and at least one second inlet opening in fluid communication with the cylindrical channel and located between the first end and the second end thereof, wherein the first inlet opening is located upstream of the at least one second inlet opening relative to a flow direction of the electrode precursor mixture through the cylindrical channel, the solvent mixture is introduced into the cylindrical channel via the first inlet opening, and the electroactive material particles and the electrically conductive agent are introduced into the cylindrical channel via the at least one second inlet opening.

7. The method of claim 1, wherein the electrode precursor mixture is deposited on the metal substrate in step (c) at a temperature of greater than or equal to about 25 degrees Celsius to less than or equal to about 80 degrees Celsius.

8. The method of claim 1, wherein the first set of rollers are spaced-apart from one another by a gap of greater than or equal to about 200 micrometers to less than or equal to about 250 micrometers.

9. The method of claim 1, wherein drying the electrode precursor layer comprises heating the electrode precursor layer at a temperature of greater than or equal to about 50° C. to less than or equal to about 150° C. for a duration of greater than or equal to about 30 seconds to less than or equal to about 10 minutes to evaporate the solvent therefrom.

10. The method of claim 1, further comprising:
- prior to step (d), applying a release film to the facing surface of the electrode precursor layer to form a laminate structure including the metal substrate, the electrode precursor layer, and the release film,
- wherein the electrode precursor layer is calendared in step (d) by passing the laminate structure between the first set of rollers.

11. The method of claim 10, further comprising:
- after step (d) and prior to step (e), removing the release film from the facing surface of the electrode precursor layer.

12. The method of claim 1, further comprising:
- after step (e), calendaring the solid electrode layer by passing the solid electrode layer and the metal substrate between a second set of rollers to consolidate the electroactive material particles, the electrically conductive agent, and the binder in the solid electrode layer and form the composite electrode.

13. The method of claim 12, wherein the second set of rollers are spaced-apart from one another by a gap of greater than or equal to about 100 micrometers to less than or equal to about 200 micrometers.

14. The method of claim 12, wherein, prior to calendaring the solid electrode layer, the solid electrode layer exhibits a porosity of greater than or equal to about 40%, and wherein, after calendaring the solid electrode layer, the solid electrode layer exhibits a porosity of greater than or equal to about 20% to less than or equal to about 35%.

15. The method of claim 1, wherein, by weight, the electroactive material particles constitute greater than or equal to about 90% to less than or equal to about 99% of the solid electrode layer, the binder constitutes greater than or equal to about 0.1% to less than or equal to about 9% of the solid electrode layer, and the electrically conductive agent constitutes greater than or equal to about 0.5% to less than or equal to about 5% of the solid electrode layer.

16. A method of manufacturing a composite positive electrode for an electrochemical cell that cycles lithium ions, the method comprising the following steps:

(a) introducing a solvent mixture comprising a polar aprotic solvent and a binder into a screw extruder, wherein the polar aprotic solvent comprises γ-valerolactone, dihydrolevoglucosenone, or a combination thereof, and wherein the binder comprises polyvinylidene fluoride or a copolymer thereof;

(b) introducing electroactive material particles and an electrically conductive agent into the solvent mixture in the screw extruder to form an electrode precursor mixture having a solids content of, by weight, greater than or equal to about 80%, the electroactive material particles comprising at least one transition metal oxide;

(c) discharging the electrode precursor mixture from the screw extruder and depositing the electrode precursor mixture on a surface of a metal substrate to form an electrode precursor layer on the metal substrate, the electrode precursor layer having a facing surface that faces away from the metal substrate;

(d) applying a release film to the facing surface of the electrode precursor layer to form a laminate structure including the metal substrate, the electrode precursor layer, and the release film;

(e) calendaring the electrode precursor layer by passing the laminate structure between a first set of rollers to adhere the electrode precursor layer to and uniformly distribute the electrode precursor layer over the metal substrate;

(f) removing the release film from the facing surface of the electrode precursor layer;

(g) drying the electrode precursor layer to remove the solvent from the electrode precursor layer and form a solid electrode layer including the electroactive material particles, the electrically conductive agent, and the binder on the surface of the metal substrate; and (h) calendaring the solid electrode layer by passing the solid electrode layer and the metal substrate between a second set of rollers to consolidate the electroactive material particles, the electrically conductive agent, and the binder in the solid electrode layer and form the composite positive electrode.

17. The method of claim 16, wherein the method is performed on a continuous basis using a roll-to-roll technique, wherein the metal substrate is in the form of a continuous web extending between an inlet roll and an outlet roll, and wherein, after calendaring the solid electrode layer, the composite positive electrode is wound around the outlet roll.

18. The method of claim 16, wherein the screw extruder comprises a stationary barrel defining a cylindrical channel extending between a first end and an opposite second end thereof, and a rotatable screw disposed within the cylindrical channel, and wherein the rotatable screw has an axis of rotation extending at an angle of greater than or equal to about 0 degrees to less than or equal to about 180 degrees with respect to a plane defined by the surface of the metal substrate.

19. The method of claim 18, wherein the stationary barrel comprises a first inlet opening and at least one second inlet opening in fluid communication with the cylindrical channel and located between the first end and the second end thereof, wherein the first inlet opening is located upstream of the at least one second inlet opening relative to a flow direction of the electrode precursor mixture through the cylindrical channel, the solvent mixture is introduced into the cylindrical channel via the first inlet opening, and the electroactive material particles and the electrically conductive agent are introduced into the cylindrical channel via the at least one second inlet opening.

20. The method of claim 16, wherein the electrode precursor mixture is deposited on the metal substrate at a temperature of greater than or equal to about 25 degrees Celsius to less than or equal to about 80 degrees Celsius.

* * * * *